United States Patent
Tsukada et al.

(10) Patent No.: US 8,371,987 B2
(45) Date of Patent: Feb. 12, 2013

(54) AUTOMATIC SPEED CHANGE CONTROL SYSTEM FOR VEHICLE

(75) Inventors: Yoshiaki Tsukada, Saitama (JP); Takashi Ozeki, Saitama (JP); Hiroyuki Kojima, Saitama (JP); Yoshiaki Nedachi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1177 days.

(21) Appl. No.: 12/236,279

(22) Filed: Sep. 23, 2008

(65) Prior Publication Data

US 2009/0082175 A1 Mar. 26, 2009

(30) Foreign Application Priority Data

Sep. 26, 2007 (JP) ................... 2007-249814

(51) Int. Cl.
*F16H 59/74* (2006.01)
(52) U.S. Cl. .......................................... 477/99
(58) Field of Classification Search .................. None
See application file for complete search history.

(56) References Cited

U.S. PATENT DOCUMENTS

| | | | |
|---|---|---|---|
| 6,354,981 B1 * | 3/2002 | Ohtsuka | 477/99 |
| 6,384,490 B1 | 5/2002 | Birzl et al. | |
| 6,569,057 B2 | 5/2003 | Jones et al. | |
| 7,381,148 B2 | 6/2008 | Nazari et al. | |
| 2006/0155435 A1 | 7/2006 | Dell et al. | |

FOREIGN PATENT DOCUMENTS

| | | |
|---|---|---|
| DE | 19729354 A1 | 1/1998 |
| DE | 19903150 A1 | 8/2000 |
| DE | 10017936 A1 | 11/2000 |
| EP | 1022459 A1 | 7/2000 |
| EP | 1661749 A1 | 5/2006 |
| GB | 2316306 A | 1/1998 |
| JP | 61-69551 U | 5/1986 |
| JP | 2006-170224 A | 6/2006 |

* cited by examiner

*Primary Examiner* — David D Le
*Assistant Examiner* — Erin D Bishop
(74) *Attorney, Agent, or Firm* — Birch, Stewart, Kolasch & Birch, LLP

(57) ABSTRACT

In an automatic speed change control system for a vehicle wherein a transmission is operated by use of an actuator, to contrive an alleviation of the burden in a shifting operation made by the user after a system starting operation. A shift actuator for controlling the speed change operation of the transmission is provided in a power transmission path. When the transmission is not in a neutral condition at the time when a predetermined system starting operation is conducted, the shift actuator is operated so as to put the transmission into the neutral condition.

12 Claims, 7 Drawing Sheets

AUTOMATIC SPEED CHANGE CONTROL SYSTEM FOR VEHICLE

CROSS-REFERENCE TO RELATED APPLICATIONS

The present application claims priority under 35 USC 119 to Japanese Patent Application No. 2007-249814 filed on Sep. 26, 2007 the entire contents of which are hereby incorporated by reference.

FIELD OF THE INVENTION

The present invention relates to an automatic speed change control system for a vehicle.

DESCRIPTION OF BACKGROUND ART

Conventionally, an automatic speed change control system for a vehicle is known wherein a transmission is operated by use of an actuator, and in which clutch engaging and disengaging operations are automatically conducted according to a brake operation and the like after a system starting operation. See, for example, Japanese Patent Laid-Open No. 2006-170224.

In the above-mentioned background art, the shift condition (a neutral condition or an in-gear condition) of the transmission at the system ending time is maintained until the system starting time, and the shift condition is grasped in this case by relying on the shifting operation made by the user. Therefore, there is a request for alleviating the burden in such an operation.

SUMMARY AND OBJECTS OF THE INVENTION

Accordingly, it is an object of an embodiment of the present invention to contrive an alleviation of the burden in a shifting operation made by the user after a system starting operation, in an automatic speed change control system for a vehicle in which a transmission is operated by use of an actuator.

As means for solving the above problem, the invention according of an embodiment of the present invention provides an automatic speed change control system for a vehicle, including a transmission 47 which is provided in a power transmission path between an engine 13 and a drive wheel, for example, a rear wheel 11 in the embodiment and in which the speed ratio in the power transmission is varied. A shift actuator 39 is provided for controlling a speed change operation of the transmission wherein when the transmission is not in a neutral condition at the time when a predetermined system starting operation is conducted, the shift actuator is operated so as to put the transmission into the neutral condition.

According of an embodiment of the present invention, the operation of the shift actuator is conducted in a period from the time of the system starting operation to the time immediately after the starting of the engine.

According of an embodiment of the present invention, the operation of the shift actuator is conducted a plurality of times until the transmission reaches the neutral condition.

According of an embodiment of the present invention, the system starting operation is an operation of turning ON an ignition switch SW4.

According of an embodiment of the present invention, the automatic speed change control system further includes a clutch (for example, twin clutches 26 in the embodiment) for making and interrupting the power transmission, wherein the clutch is disengaged at the time of operating the shift actuator.

According of an embodiment of the present invention, the automatic speed change control system is a twin clutch type speed change control system in which gear position is changed over by switching between a pair of clutches, for example, first and second disk clutches 51a and 51b.

According of an embodiment of the present invention, even in the case where the transmission is not in the neutral condition at the system starting time, the transmission can be automatically returned into the neutral condition by use of the shift actuator in the period from the time of the system starting operation to the time immediately after the starting of the engine. Therefore, it is possible to alleviate the burden in the shifting operation made on the transmission by the user after the system starting operation, to enhance the convenience in use, and to secure a vehicle starting operation after the starting of the system.

In addition, according of an embodiment of the present invention, even in the case where the neutral condition cannot be attained due to dog interference in the transmission or the like trouble before the starting of the engine, the transmission can be brought into the neutral condition automatically and assuredly, by again operating the shift actuator immediately after the starting of the engine.

According of an embodiment of the present invention, the system starting operation can be performed assuredly before the starting of the engine.

According of an embodiment of the present invention, an assured engine starting can be achieved even when the transmission is in an in-gear condition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
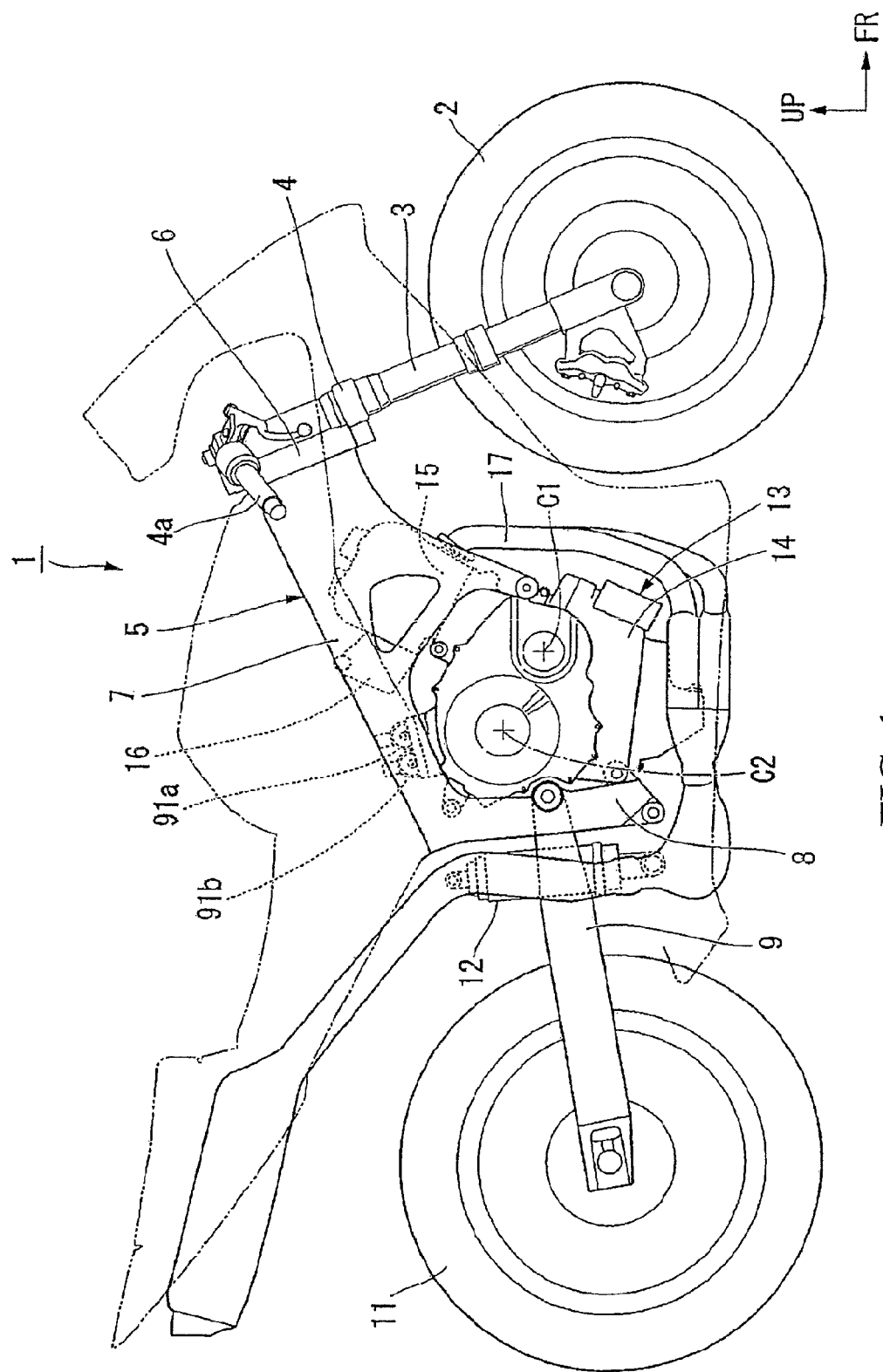
FIG. 1 is a right side view of a motorcycle in an embodiment of the present invention.

Now, an embodiment of the present invention will be described below referring to the drawings. The front, rear, left, right and the like sides (directions) in the following description are the same as the sides (directions) with respect to a vehicle unless otherwise specified. In addition, arrow FR in the drawings indicates the front side of the vehicle, arrow LH indicates the left-hand side of the vehicle, and arrow UP indicates the upper side of the vehicle.

As shown in FIG. 1, an upper part of a front fork 3 rotatably supporting a front wheel 2 in a motorcycle (saddle ride type vehicle) 1 is steerably supported by a head pipe 6 provided at a front end part of a body frame 5, through a steering stem 4. A steering handle 4a is attached to an upper part of the steering stem 4 (or the front fork 3). From the head pipe 6, a main frame 7 extends rearwards, to be connected to pivot plates 8. Front end parts of swing arms 9 are vertically swingably supported on the pivot plates 8, and a rear wheel 11 is rotatably supported on rear end parts of the swing arms 9. A shock absorber unit 12 is interposed between the swing arm 9 and the body frame 5. On the inner side of the body frame 5, an engine (internal combustion engine) 13 as a prime mover of the motorcycle 1 is suspended.

Figure 2:
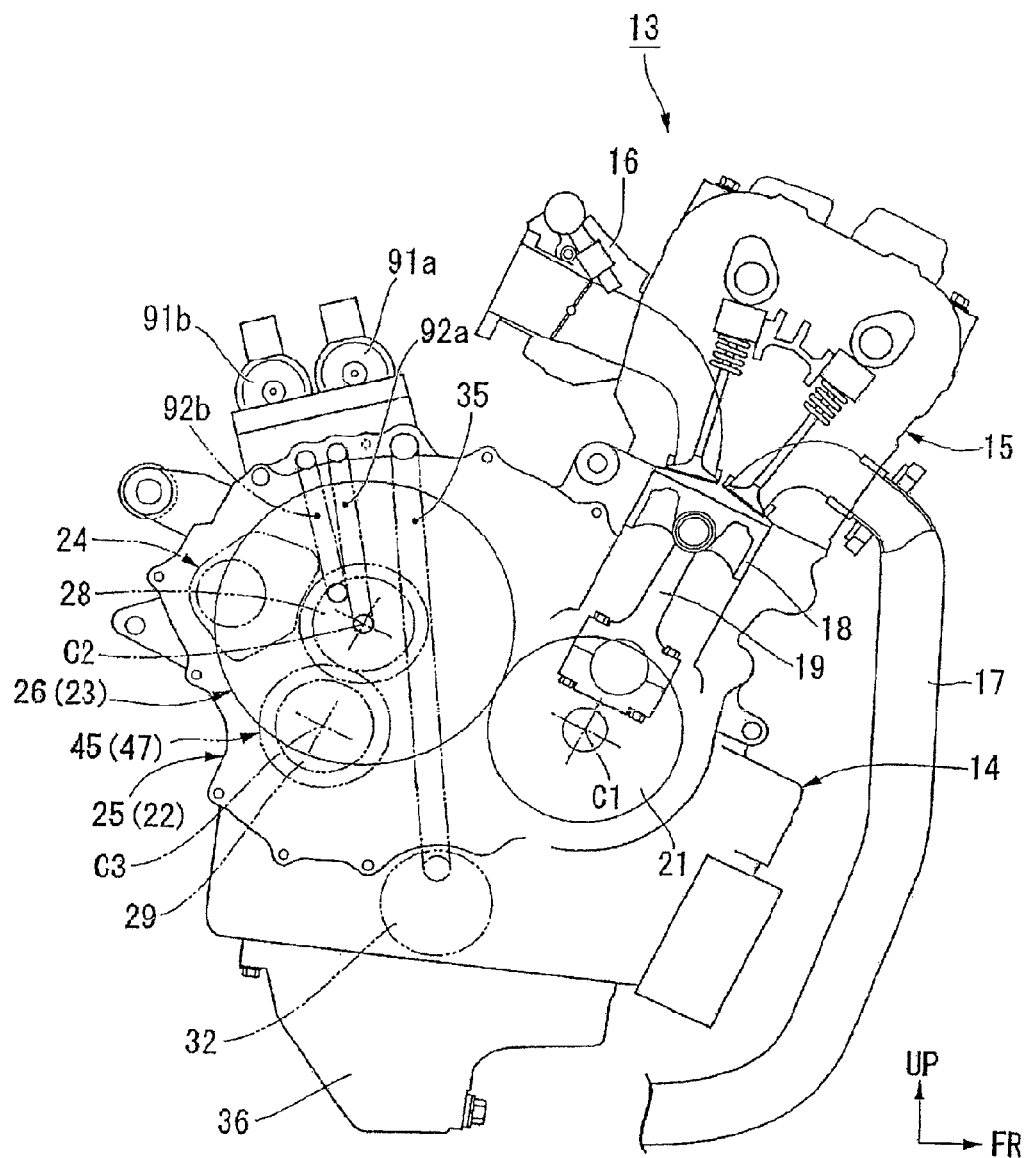
FIG. 2 is a right side view of an engine of the motorcycle.

Referring to FIG. 2, the engine 13 is a parallel four-cylinder engine with a rotational center axis C1 of a crankshaft 21 set in the vehicle width direction (left-right direction), wherein cylinders 15 are erectly provided on a crankcase 14, a corresponding piston 18 is reciprocatably fitted in each of the cylinders 15, and reciprocation of each piston 18 is converted into rotation of the crankshaft 21 through connecting rods 19. A throttle body 16 is connected to a rear part of the cylinder 15, and an exhaust pipe 17 is connected to a front part of the cylinder 15.

A transmission case 22 is provided on the rear side of and integrally with the crankcase 14, and a twin clutch type transmission 23 and a change mechanism 24 are contained in the transmission case 22. A right side part of the transmission case 22 is made to be a clutch case 25, and twin clutches 26 of the twin clutch type transmission 23 are contained in the clutch case 25. Rotational power of the crankshaft 21 serving as a motive power source of the engine 13 is outputted to the left side of the transmission case 22 through the twin clutch type transmission 23, and is transmitted to the rear wheel 11 through a power transmission mechanism of a chain type, for example. Symbols C2 and C3, respectively, denote rotational center axes of a main shaft 28 and a counter shaft 29 of the twin clutch type transmission 23.

Figure 3:
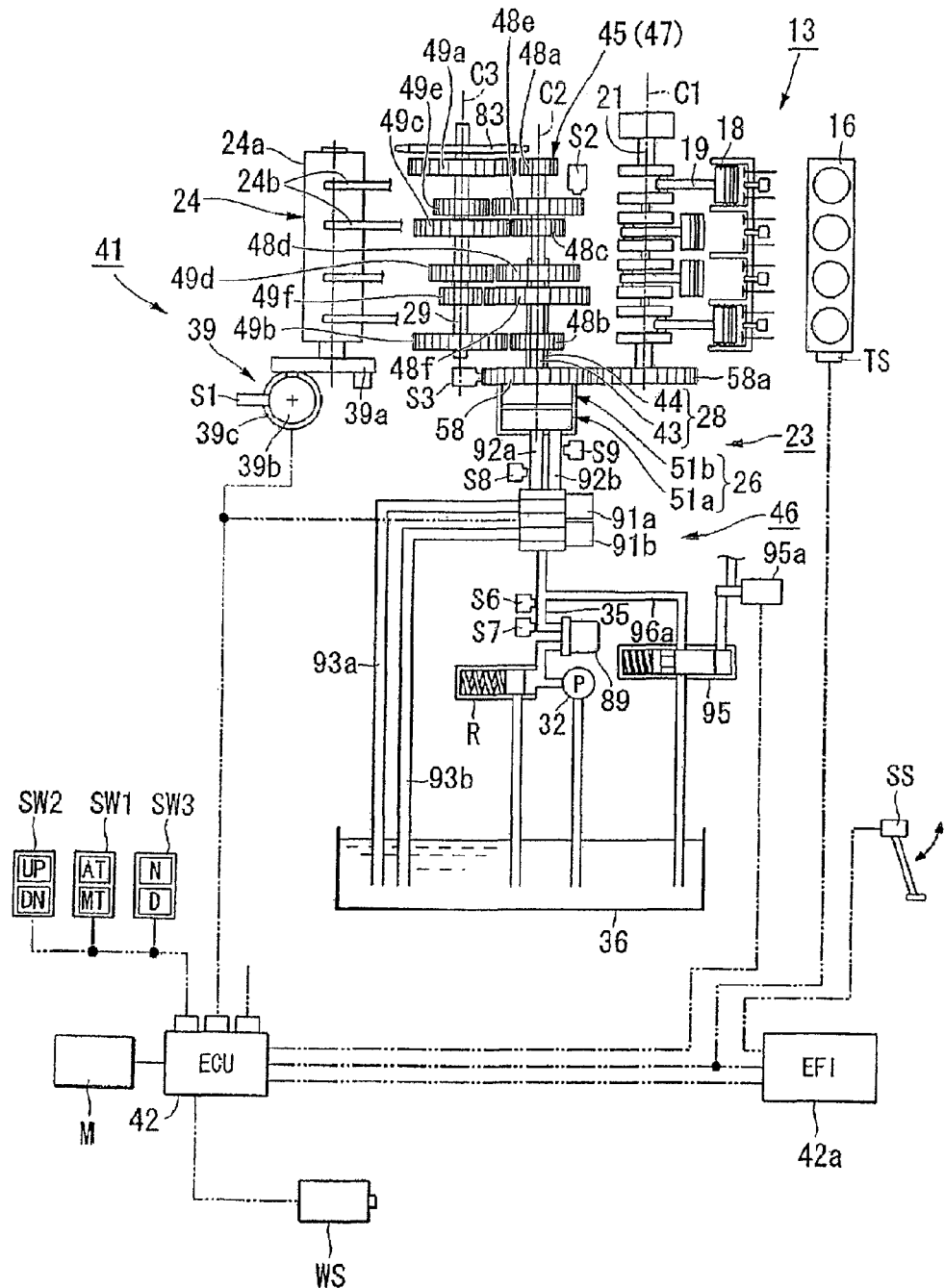
FIG. 3 is a block diagram of an automatic speed change control system in the motorcycle.

As shown in FIG. 3, the motorcycle 1 is provided with an automatic speed change control system (twin clutch type speed change control system) which mainly includes the twin clutch type transmission 23 provided in connection with the engine 13, a gear shift device 41 configured by providing the change mechanism 24 with a driving mechanism (hereinafter, will in some cases be referred to as the shift actuator) 39, and an electronic control unit (ECC) 42 for controlling the operations of the twin clutch type transmission 23 and the gear shift device 41.

Figure 4:
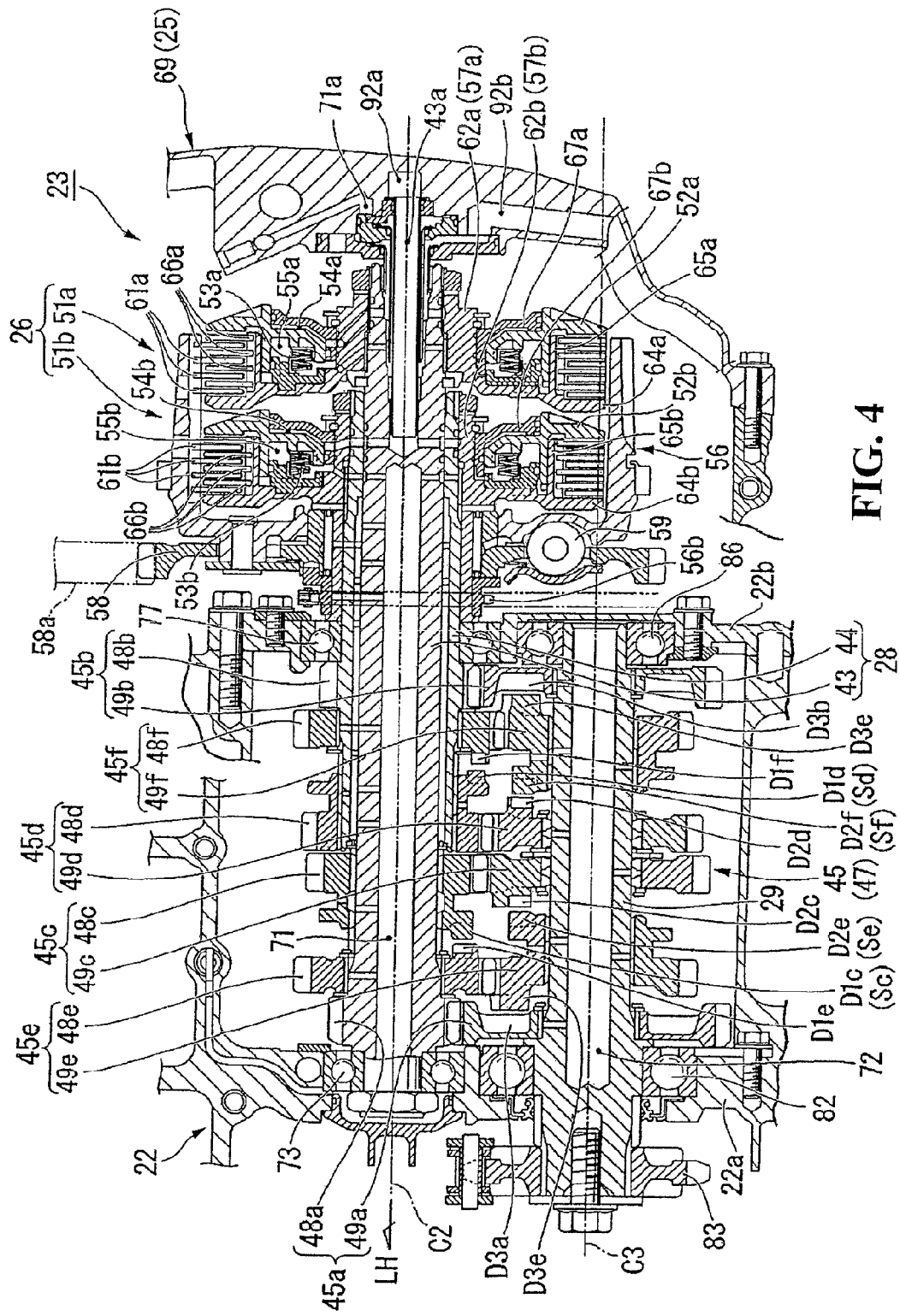
FIG. 4 is a sectional view of a twin clutch type transmission of the motorcycle.

Referring to FIG. 4 also, the twin clutch type transmission 23 includes the main shaft 28 having a double structure composed of inner and outer shafts 43, 44 with the counter shaft 29 being disposed in parallel to the main shaft 28. A speed change gear group 45 is disposed bridgingly between the main shaft 28 and the counter shaft 29 with the twin clutches 26 coaxially disposed at a right end part of the main shaft 28. An oil pressure supply system 46 is provided for supplying a working oil pressure to the twin clutches 26. Hereinafter, the assembly composed of the main shaft 28, the counter shaft 29 and the speed change gear group 45 is referred to as transmission 47.

The main shaft 28 has a structure in which a right end part of the inner shaft 43 extending bridgingly between left and right parts of the transmission case 22 is mutually rotatably inserted in the outer shaft 44. On the outer peripheries of the inner and outer shafts 43, 44, drive gears 48a to 48f for six gear speeds in the speed change gear group 45 are disposed distributedly. On the other hand, driven gears 49a to 49f for six gear speeds in the speed change gear group 45 are disposed on the outer periphery of the counter shaft 29. The drive gears 48a to 48f and the driven gears 49a to 49f are meshed with each other on the basis of the position of each gear, to constitute speed change gear pairs 45a to 45f corresponding to the gear positions, respectively. In addition, the speed change gear pairs 45a to 45f are decreased in reduction gear ratio (are higher-speed gears increased in speed) in the order of from 1st gear speed to 6th gear speed.

A left end part of the inner shaft 43 reaches a left side wall 22a of the transmission case 22, and is rotatably borne on the left side wall 22a through a ball bearing 73.

On the other hand, a right side part of the inner shaft 43 penetrates a right side wall 22b of the transmission case 22 to be exposed inside the clutch case 25, and an intermediate part in the left-right direction of the inner shaft 43 is rotatably borne on the right side wall 22b of the transmission case 22 through an intermediate part in the left-right direction of the outer shaft 44 penetrating the right side wall 22b and through a ball bearing 77.

The outer shaft 44 is shorter than the inner shaft 43, and its left end part is terminated at an intermediate part in the left-right direction of the transmission case 22. On that portion of the outer shaft 44 which is located on the left side relative to the right side wall 22b, the driven gears 48b, 48d and 48f corresponding to even-ordinal gear positions (2nd, 4th and 6th speeds) in the speed change gear group 45 are supported in the order of 4th speed, 6th speed and 2nd speed from the left side. On the other hand, on that portion of the inner shaft 43 which is located on the left side of a left end part of the outer shaft 44, the drive gears 48a, 48c and 48e corresponding to odd-ordinal gear positions (1st, 3rd and 5th speeds) in the speed change gear group 45 are supported in the order of 1st speed, 5th speed and 3rd speed from the left side.

Left and right end parts of the counter shaft 29 are rotatably borne on the left and right side walls 22a, 22b of the transmission case 22 through ball bearings 82, 86, respectively. The left end part of the counter shaft 29 protrudes to the left side of the left side wall 22a, and a drive sprocket 83 of the power transmission mechanism for transmission of power to the rear wheel 11 is attached to the left end part.

The driven gears 49a to 49f in the speed change gear group 45 corresponding respectively to the gear positions are borne on that portion of the counter shaft 29 which are located on the inner side of the transmission case 22, in the same order as the drive gears 48a to 48f.

Main feed oil passages 71, 72 capable of supplying an oil pressure from a main oil pump (not shown) for pressure feed of an oil to parts in the engine 13 are formed respectively in the main shaft 28 (inner shaft 43) and the counter shaft 29, and an engine oil is appropriately supplied to the speed change gear group 45 through the main oil passages 71, 72.

The twin clutches 26 have an oil hydraulic type first and second disk clutches (hereinafter they will in some cases be referred to simply as clutches) 51a, 51b disposed coaxially with and adjacently to each other. The inner and outer shafts 43, 44 are coaxially connected respectively to the clutches 51a, 51b. A primary driven gear 58 meshed with a primary drive gear 58a on the crankshaft 21 is coaxially provided on a clutch outer 56 possessed in common by the clutches 51a, 51b, and a rotational drive force from the crankshaft 21 is inputted to the clutch outer 56 through the gears 58, 58a. The rotational drive force inputted to the clutch outer 56 is transmitted individually to the inner and outer shafts 43, 44 according to the engaged/disengaged conditions of the clutches 51a, 51b. The engaged/disengaged conditions of the clutches 51a, 51b are individually controlled by the presence/absence of an oil pressure supplied from the above-mentioned oil pressure supply system 46.

One of the clutches 51a, 51b is engaged whereas the other is disengaged, and power transmission in the transmission 47 is performed by use of one of the speed change gear pair linked to one of the inner and outer shafts 43, 44. In addition, the speed change gear pair to be used next is preliminarily selected from among the speed change gear pairs linked to the other of the inner and outer shafts 43, 44, and, starting from this condition, one of the clutches 51a, 51b is disengaged whereas the other is engaged, whereby the power transmission in the transmission 47 is changed over to that made by use of the preliminarily selected speed change gear pair, resulting in upshift or downshift in the transmission 47.

As shown in FIG. 3, the oil pressure supply system 46 includes a clutch oil pump 32 as an oil pressure generation source for the twin clutches 26 with an feed oil passage 35 extending from a discharge port of the clutch oil pump 32. First and second clutch actuators 91a, 91b are connected to the downstream side of the feed oil passage 35 with first and second supply oil passages 92a, 92b extending from the clutch actuators 91a, 91b to the engaging-side oil pressure chambers 54a, 54b, see FIG. 4, of the clutches 51a, 51b.

The clutch oil pump 32 is provided separately from the main oil pump, and operates to suck in the engine oil reserved in an oil pan 36 on the lower side of the crankcase 14 and to discharge the oil into the feed oil passage 35. An oil filter 89 for exclusive use in the oil passage is provided in the feed oil passage 35.

Symbols S6 and S7 denote an oil pressure sensor and an oil temperature sensor for detecting the oil pressure and the oil temperature in the feed oil passage 35. Symbol R denotes a relief valve for controlling the rise in the oil pressure inside the feed oil passage 35. Symbols S8, S9 denote oil pressure sensors for detecting the oil pressures in the supply oil passages 92a, 92b, i.e., the pressure of the oil fed to the clutches 51a, 51b.

Communication of the feed oil passage 35 and the first and second supply oil passages 92a, 92b can be individually made by operations of the clutch actuators 91a, 91b. When the feed oil passage 35 and the first supply oil passage 92a are made to communicate with each other through the first clutch actuator 91a, a comparatively high oil pressure from the clutch oil pump 32 is supplied through the first supply oil passage 92a into the engaging-side oil pressure chamber 54a of the first clutch 51a, whereby the first clutch 51a is engaged. On the other hand, when the feed oil passage 35 and the second supply oil passage 92b are made to communicate with each other through the second clutch actuator 91b, the oil pressure from the clutch oil pump 32 is supplied through the second supply oil passage 92b into the engaging-side oil pressure chamber 54b of the second clutch 51b, whereby the second clutch 51b is engaged.

An oil pressure relief oil passage 96a, provided with an oil pressure relief valve 95, is branched from the feed oil passage 35. The oil pressure relief valve 95 is operated by a valve actuator 95a to make changeover between opening and closing of the oil pressure relief oil passage 96a. The valve actuator 95a is controlled by the electronic control unit 42 so as to operate as follows. For example, at the time of starting the engine, the valve actuator 95a opens the oil pressure relief oil passage 96a, whereby the feed oil pressure from the clutch oil pump 32 is returned into the oil pan 36. After the starting of the engine, the valve actuator 95a closes the oil pressure relief oil passage 96a so that the feed oil pressure can be supplied to the twin clutches 26.

In addition, the clutch actuators 91a, 91b are provided respectively with return oil passages 93a, 93b for returning the oil pressure from the clutch oil pump 32 into the oil pan when the communication between the feed oil passage 35 and the first and second supply oil passages 92a, 92b is interrupted.

Figure 5:
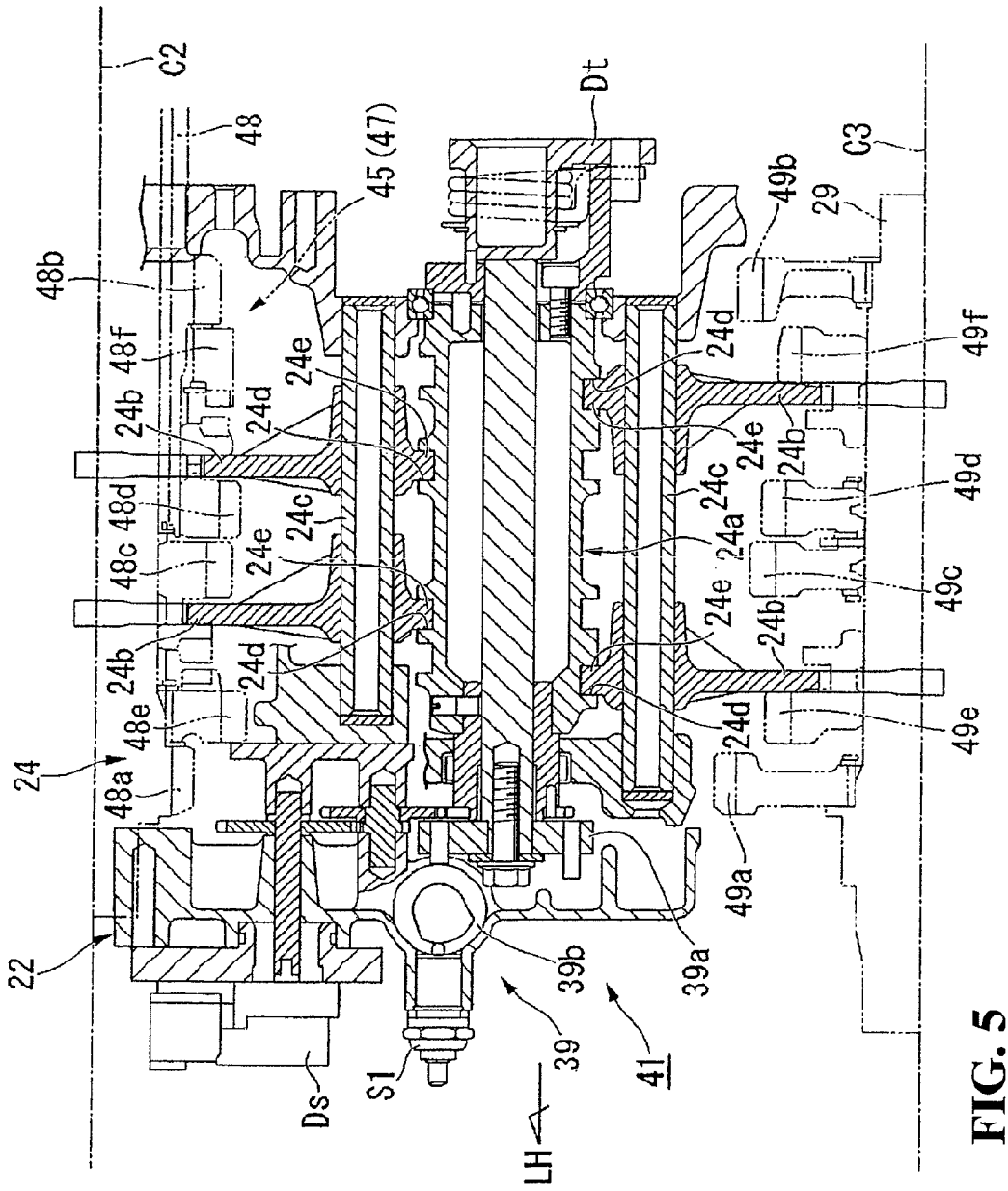
FIG. 5 is a sectional view of a change mechanism for operating the twin clutch type transmission.

As shown in FIGS. 3 and 5, the change mechanism 24 moves in the axial direction a plurality of (in this embodiment, four) shift forks 24b by rotation of a shift drum 24a disposed in parallel to the shafts 28, 29, whereby the speed change gear pair (gear position) used for power transmission between the main shaft 28 and the counter shaft 29 is changed over.

Of the shift forks 24b, one that extends to the side of the main shaft 28 and one that extends to the side of the counter shaft 29 constitute a pair, and the base end sides of these shift forks 24b are axially movably supported by a pair of shift fork rods 24c, respectively. Each of the shift forks 24b is provided on the base end side thereof with a slide projection 24e for engagement with one of a plurality of cam grooves 24d provided in the outer periphery of the shift drum 24a. Each of the shift forks 24b has tip parts thereof engaged with a slide gear (described later) in the speed change gear group 45, on the side of the main shaft 28 and on the side of the counter shaft 29. At the time of rotation of the shift drum 24a, each shift fork 24b is moved in the axial direction according to the pattern of each cam groove 24d, and the slide gear is moved in the axial direction, whereby the gear (shift) position in the transmission 47 is changed.

The above-mentioned drive mechanism 39 is provided on one end side of the shift drum 24a. The drive mechanism 39 includes a pin gear 39a coaxially fixed to the shift drum 24a in the change mechanism 24 with a worm-shaped barrel cam 39b engaged with the pin gear 39a. An electric motor 39c s provided for giving a rotational drive force to the barrel cam 39b. By driving the electric motor 39c, the shift drum 24a is rotated appropriately, whereby the gear position in the transmission 47 is changed.

Symbol S1 denotes a sensor (hereinafter referred to as the gear position sensor) for detecting the operating (moving) amount of the drive mechanism 39 for detecting the gear position in the transmission 47. Symbol DS denotes a rotational angle sensor for detecting the actual rotating angle of the shift drum 24a. Symbol DT denotes a detent for restricting the rotating angle on a gear position basis of the shift drum 24a.

As shown in FIG. 4, the transmission 47 is of the normally meshed type in which each of the drive gears 48a to 48f and each of the driven gears 49a to 49f corresponding to each of the gear positions are normally meshed with each other. The gears are largely classified into fixed gears being rotatable integrally with the relevant support shaft (each of the shafts 28, 29), free gears being mutually rotatable in relation to the support shaft, and slide gears being integrally rotatable and axially movable in relation to the shaft.

More specifically, the drive gears 48a, 48b are fixed gears, the drive gears 48c, 48d are slide gears and the drive gears 48e, 48f are free gears. In addition, the driven gears 49a to 49d are free gears, and the driven gears 49e, 49f are slide gears Hereinafter, the gears 48c, 48d, 49e, 49f will in some cases be referred to as the slide gears, and the gears 48e, 48f, 49a to 49d will in some cases be referred to as the free gears.

With arbitrary ones of the slide gears being appropriately slid (moved in the axial direction) by the change mechanism 24, power transmission by use of the speed change gear pair corresponding to one of the gear position is enabled.

On one side of the slide gears 48c, 48d, slide rings Sc, Sd are integrally rotatable and axially movable in relation to the relevant support shaft in the same manner as the slide gears 48c, 48d are provided integrally with the latter. The slide rings Sc, Sd are provided axially adjacently to the free gears 48e, 48f respectively. The slide rings Sc, Sd are provided respectively with slide-side dogs (dowels) D1c, D1d, whereas the free gears 48e, 48f are provided respectively with free-side dogs (dowels) D1e, D1f corresponding respectively to the slide-side dogs D1c, D1d.

In addition, on one side of the slide gears 49e, 49f, slide rings Se, Sf are integrally rotatable and axially movable in relation to the relevant support shaft in the same manner as the slide gears 49e, 49f are provided integrally with the latter. The slide rings Se, Sf are provided axially adjacently to the free gears 49c, 49d, respectively. The slide rings Se, Sf are provided respectively with slide-side dogs (dowels) D2e, D2f, whereas the free gears 49c, 49d are provided respectively with free-side dogs (dowels) D2c, D2d corresponding respectively to the slide-side dogs D2e, D2f.

Further, slide-side dogs (dowels) D3e, D3f are provided on the other side of the slide gears 49e, 49f, and the free gears 49a, 49b axially adjacent to the slide-side dogs D3e, D3f are provided respectively with free-side dogs (dowels) D3a, D3b corresponding respectively to the slide-side dogs D3e, D3f.

The slide-side dog and the free-side dog are mutually non-rotatably engaged with each other when the corresponding slide gear (inclusive of the slide ring) and free gear come close to each other, and the engagement is canceled when the corresponding slide gear and free gear are separated away from each other.

Then, with one of the slide gears and the corresponding free gear being mutually non-rotatably engaged with each other through the dog, power transmission, by selective use of one of the speed change gear pair between the main shaft 28 and the counter shaft 29, is enabled. This condition is defined as the in-gear condition (the condition where the gear position is in an in-gear position) of the transmission 47.

On the other hand, in the condition where the engagements between the slide gears and the corresponding free gears are all canceled (in the condition shown in FIG. 4), the power transmission between the shafts 28 and 29 is disabled. This condition is defined as the neutral condition (the condition where the gear position is in a neutral position) of the transmission 47.

As shown in FIG. 3, based not only on the data from the above-mentioned sensors but also on the data from a throttle valve position sensor (throttle position sensor) TS for the throttle body 16, a side stand (or center stand) storage sensor (switch) SS, a wheel speed sensor WS for the front wheel 2 as well as, for example, a mode switch SW1, a gear selection switch SW2, and a neutral-drive changeover switch SW3 provided on the steering handle 4a, etc., the electronic control unit 42 controls the operations of the twin clutch type transmission 23 and the gear shift device 41, thereby changing the gear position in the transmission 47.

The speed change mode selected by operating the mode switch SW1 includes a full-automatic (AT) mode in which the gear position in the transmission 47 is automatically changed over based on vehicle data such as vehicle speed (wheel speed) and engine speed, and a semi-automatic (MT) mode in which the gear position in the transmission 47 can be changed over only by operation of the gear selection switch SW2 based on the driver's will. The current speed change mode and gear position are displayed, for example, on a meter device M provided in the vicinity of the steering handle 4a. In addition, by operation of the neutral-drive changeover switch SW3, the transmission 47 can be changed over between a condition where power transmission at a predetermined gear position is possible and the neutral condition.

Symbol S2 denotes a vehicle speed sensor for detecting the rotating speed of the main shaft 28 (detecting the rotating speed of the drive gear 48e meshed with the driven gear 49e rotated as one body with the counter shaft 29) for detecting the vehicle speed. Symbol S3 denotes a rotating speed sensor (hereinafter referred to as the engine speed sensor) for detecting the rotating speed of the primary driven gear 58 for detecting the engine speed (the rotating speed of the crankshaft 21). The electronic control unit 42 shares the data from the sensors with an ECU 42a for a fuel injection system.

As shown in FIG. 4, the twin clutches 26 have a structure in which the first clutch 51a linked to the speed change gear pairs for odd-ordinal gear positions is disposed on the right side (on the outer side in the vehicle width direction) in the clutch case 25, and the second clutch 51b linked to the speed change gear pairs for even-ordinal gear positions is disposed on the left side (on the inner side in the vehicle width direction) in the clutch case 25. The clutches 51a, 51b are each a wet-type multiple disk clutch having a plurality of clutch disks (clutch disks 61a, 61b and clutch plates 66a, 66b) overlapping alternately in the axial direction.

Each of the clutches 51a, 51b is of an oil hydraulic type in which the pressure plate 52a, 52b is displaced in the axial direction by a supply oil pressure supplied externally, thereby obtaining a predetermined engaging force. Each of the clutches 51a, 51b includes a return spring 53a, 53b for urging the pressure plate 52a, 52b toward the clutch disengaging side, the engaging-side oil pressure chamber 54a, 54b for exerting a pushing force toward the clutch engaging side on the pressure plate 52a, 52b and a disengaging-side oil pressure chamber 55a, 55b for exerting a pushing force toward the clutch disengaging side on the pressure plate 52a, 52b so as to assist the returning motion of the latter.

Each of the disengaging-side oil pressure chambers 55a, 55b is normally supplied with a comparatively low oil pressure from the above-mentioned main oil pump, and the engaging-side oil pressure chambers 54a, 54b are selectively and individually supplied with a comparatively high oil pressure from the oil pressure supply system 46 (the clutch oil pump 32).

The clutches 51a, 51b share the single clutch outer 56 with each other, and are configured to be substantially equal in diameter. The clutch outer 56 is in the shape of a bottomed cylinder opened to the right side, and a central part of a bottom part thereof is mutually rotatably supported by an intermediate part in the left-right direction of the outer shaft 44. A clutch center 57a for the first clutch 51a is disposed on the left inner side of the clutch outer 56, whereas a clutch center 57b for the second clutch 51b is disposed on the right inner side of the clutch outer 56. The clutch center 57a is integrally rotatably supported on a right end part of the inner shaft 43, whereas the clutch center 57b is integrally rotatably supported on a right end part of the outer shaft 44.

The primary driven gear 58 is mounted to the left side of a bottom part of the clutch outer 56, with a spring damper 59 therebetween, and the primary driven gear 58 is meshed with the primary drive gear 58a of the crankshaft 21. Therefore, a rotational power of the crankshaft 21 is inputted to the clutch outer 56 through the spring damper 59. The clutch outer 56 is rotated attendant on the rotation of the crankshaft 21 and separately from the main shaft 28.

A drive sprocket 56b for driving each oil pump is integrally rotatably provided on the left side, relative to the primary driven gear 58, of the clutch outer 56. A plurality of the clutch plates 61a for the first clutch 51a are integrally rotatably supported on the right inner periphery of the clutch outer 56, whereas a plurality of the clutch plates 61b for the second clutch 51b are integrally rotatably supported on the left inner periphery of the clutch outer 56.

The clutch outer 56 is provided in its outer periphery with a plurality of engaging grooves along the axial direction, whereas the clutch plates 61a, 61b are each provided at the outer periphery thereof with a plurality of engaging projections corresponding to the engaging grooves, and the engaging projections are mutually non-rotatably engaged with the engaging grooves, whereby the clutch plates 61a, 61b are integrally rotatably supported on the clutch outer 56.

A flange part 64a on the left side of the clutch center 57a of the first clutch 51a is provided with an inner wall part 65a erected to the right, and a plurality of the clutch disks (friction plates) 66a are integrally rotatably supported on the outer periphery of the inner wail part 65a.

The clutch center 57a is provided in its outer periphery with a plurality of engaging grooves along the axial direction, each of the clutch disks 66a is provided at its inner periphery with a plurality of engaging projections corresponding to the engaging grooves, and the engaging projections are mutually non-rotatably engaged with the engaging grooves, whereby the clutch disks 66a are integrally rotatably supported on the clutch center 57a.

The above-mentioned pressure plate 52a is oppositely disposed on the right side of the flange part 64a, and, between the outer periphery side of the pressure plate 52a and the outer periphery side of the flange part 64a. The above-mentioned clutch plates 61a and clutch disks 66a are disposed in the state of being alternately stacked in the axial direction.

Between the inner periphery side of the pressure plate 52a and the inner periphery side of the flange part 64a, the above-mentioned disengaging-side oil pressure chamber 55a is formed and the return spring 53a for urging the pressure plate 52a to the right side (to the side for spacing away from the flange part 64a, i.e., to the clutch disengaging side) is disposed.

A support flange part 67a provided at the outer periphery of a central tubular part 62a on the right side of the clutch center 57a is oppositely disposed on the right side of the inner periphery side of the pressure plate 52a. Between the support flange part 67a and the inner periphery side of the pressure plate 52a, the above-mentioned engaging-side oil pressure chamber 54a is formed and the return spring 53a is disposed.

On the other hand, a flange part 64b on the left side of the clutch center 57b of the second clutch 51b is provided with an inner wall part 65b erected to the right, and a plurality of the clutch disks 66b are integrally rotatably supported on the outer periphery of the inner wall part 65b.

The clutch center 57b is provided in its outer periphery with a plurality of engaging grooves along the axial direction, each of the clutch disks 66b is provided at its inner periphery with a plurality of engaging projections corresponding to the engaging grooves, and the engaging projections are mutually non-rotatably engaged with the engaging grooves, whereby the clutch disks 66b are integrally rotatably supported on the clutch center 57b.

The above-mentioned pressure plate 52b is oppositely disposed on the right side of the flange part 64b, and, between the outer periphery side of the pressure plate 52b and the outer periphery side of the flange part 64b, the above-mentioned clutch plates 61b and clutch disks 66b are disposed in the state of being alternately stacked in the axial direction.

Between the inner periphery side of the pressure plate 52b and the inner periphery side of the flange part 64b, the above-mentioned disengaging-side oil pressure chamber 55b is formed and a return spring 53b for urging the pressure plate 52b to the right side (to the side for spacing away from the flange part 64b, i.e., to the clutch disengaging side) is disposed.

A support flange part 67b provided at the outer periphery of a central tubular part 62b on the right side of the clutch center 57b is oppositely disposed on the right side on the inner periphery side of the pressure plate 52b. Between the support flange part 67b and the inner periphery side of the pressure plate 52b, the above-mentioned engaging-side oil pressure chamber 54b is formed and the return spring 53b is disposed.

A clutch cover 69 constituting the right side of the above-mentioned clutch case 25 is provided with a first supply oil passage 92a, a second supply oil passage 92b, and an in-cover main supply oil passage 71a. In addition, oil passages communicating individually with the oil passages 92a, 92b, 71a are formed in a right hollow part 43a of the inner shaft 43.

As a result, oil pressure from the clutch oil pump 32 can be supplied through the first supply oil passage 92a and the like into the engaging-side oil pressure chamber 54b of the second clutch 51b, oil pressure from the above-mentioned main oil pump can be supplied through the in-cover main supply oil passage 71 and the like into the disengaging-side oil pressure chamber 55a of the first clutch 51a, and oil pressure from the clutch oil pump 32 can be supplied through the second supply oil passage 92b and the like into the engaging-side oil pressure chamber 54a of the first clutch 51a. In addition, the disengaging-side oil pressure chamber 55b of the second clutch 51b can be supplied with an oil pressure from the main oil pump through the main supply oil passage 71 and the like.

In the condition where the engine is stopped (in the condition where the oil pumps are stopped), the clutches 51a, 51b are in the disengaged condition wherein the pressure plates 52a, 52b are displaced to the right side by the urging forces of the return springs 53a, 53b, and the frictional engagement between the clutch plates 61a, 61b and the clutch disks 66a, 66b is canceled. In the condition during operation of the engine and the supply of the oil pressure from the oil pressure supply system 46 is stopped, the urging forces of the return springs 53a, 53b and the oil pressures in the disengaging-side oil pressure chambers 55a, 55b act on the pressure plates 52a, 52b, whereby the clutches 51a, 51b are again placed in the disengaged condition.

On the other hand, in the condition where the engine is in operation and a comparatively high oil pressure is supplied from the oil pressure supply system 46 into the engaging-side oil pressure chamber 54a in the first clutch 51a, the pressure plate 52a is moved to the left side (to the flange part 64a side, i.e., to the clutch engaging side) against the oil pressure in the disengaging-side oil pressure chamber 55a and the urging force of the return spring 53a, and the clutch plates 61a and the clutch disks 66a are pressed into frictional engagement with each other, resulting in the clutch engaged condition wherein torque transmission between the clutch outer 56 and the clutch center 57a is possible.

Similarly, during operation of the engine and a comparatively high oil pressure is supplied from the oil pressure supply system 46 into the engaging-side oil pressure chamber 54b in the second clutch 51b, the pressure plate 52b is moved to the left side (to the flange part 64b side, i.e., to the clutch engaging side) against the oil pressure in the disengaging-side oil pressure chamber 55b and the urging force of the return spring 53b, and the clutch plate 61b and the clutch disks 66b are pressed into frictional engagement with each other, resulting in the clutch engaged condition wherein torque transmission between the clutch outer 56 and the clutch center 57b is possible.

When the supply of the oil pressure into the engaging-side oil pressure chamber 54a, 54b is stopped under the condition where the clutch 51a, 51b is in the engaged condition, the pressure plate 52a, 52b is displaced to the left side by the oil pressure in the disengaging-side oil pressure chamber 55a, 55b and the urging force of the return spring 53a, 53b. Thus, the frictional engagement between the clutch plates 61a, 61b and the clutch disks 66a, 66b is canceled, resulting in the clutch disengaged condition wherein torque transmission between the clutch outer 56 and the clutch center 57a, 57b is impossible.

The engine oil supplied into the disengaging-side oil pressure chamber 55a, 55b of the clutch 51a, 51b is guided to the exterior of the oil pressure chamber through the oil passages formed appropriately in the inner wall part 65a, 65b and the like, thereby being appropriately supplied to the clutch plates 61a, 61b and the clutch disks 66a, 66b at the outer periphery of the inner wall part 65a, 65b. By thus relieving the working oil present in the disengaging-side oil pressure chamber 55a, 55b, the oil pressure inside the disengaging-side oil pressure chamber 55a, 55b is kept at a predetermined low pressure, and the lubrication performance and the cooling performance in regard of the clutch plates 61a, 61b and the clutch disks 66a, 66b in the clutch 51a, 51b in the disengaged condition are enhanced.

In the twin clutch type transmission 23, in the case where the motorcycle 1 is judged as being stopped on the basis of the side stand being erecting or the like fact even after the engine is started, both of the clutches 51a and 51b are kept in the disengaged condition. Then, when for example the side stand is stored or the switch SW1, SW2 or SW3 is operated, the transmission 47 is shifted from the neutral condition to a 1st gear speed condition such as to enable power transmission by use of the 1st gear (starting gear, i.e., the speed change gear pair 45a) as a preparation for starting the motorcycle 1. When, for example, the engine speed is raised starting from this condition, the first clutch 51a is brought through a half-clutch condition into the engaged condition, whereby the motorcycle 1 is started.

During the operation of the motorcycle 1, only one of the clutches 51a, 51b is in the engaged condition depending on the current shift positions thereof, whereas the other is kept disengaged. As a result, power is transmitted through one of the inner and outer shafts 43, 44 and one of the speed change gear pairs 45a to 45f. In this case, the electronic control unit 42 controls the operation of the twin clutch type transmission 23 on the basis of vehicle data, so as to preliminarily prepare a condition where power transmission by use of a speed change gear pair corresponding to the next shift position is possible.

More specifically, where the current shift position (gear position) is for example an odd-ordinal gear position (or even-ordinal gear position), the next shift position is an even-ordinal gear position (or odd-ordinal gear position). In this case, therefore, a condition where power transmission by use of a speed change gear pair for the even-ordinal gear position (or odd-ordinal gear position) is possible is preliminarily developed.

In this instance, the first clutch 51a is in the engaged condition, but the second clutch 51b (or the first clutch 56a) is in the disengaged condition, so that the engine output (the rotational power of the crankshaft 21) is not transmitted to the outer shaft 44 (or the inner shaft 43) and the speed change gear pair for the even-ordinal gear position (or odd-ordinal gear position).

Thereafter, when the electronic control unit 42 judges that a timing for gear shift is reached, the first clutch 51a (or the second clutch 51b) is disengaged and the second clutch 51b (or the first clutch 51a) is engaged, simply, whereby the power transmission is changed over to one for transmitting power by use of the speed change gear pair corresponding to the next shift position which has preliminarily been selected. Accordingly, it is possible to achieve a swift and smooth speed change, without any time lag in speed change and without any interruption of power transmission.

Figure 6:
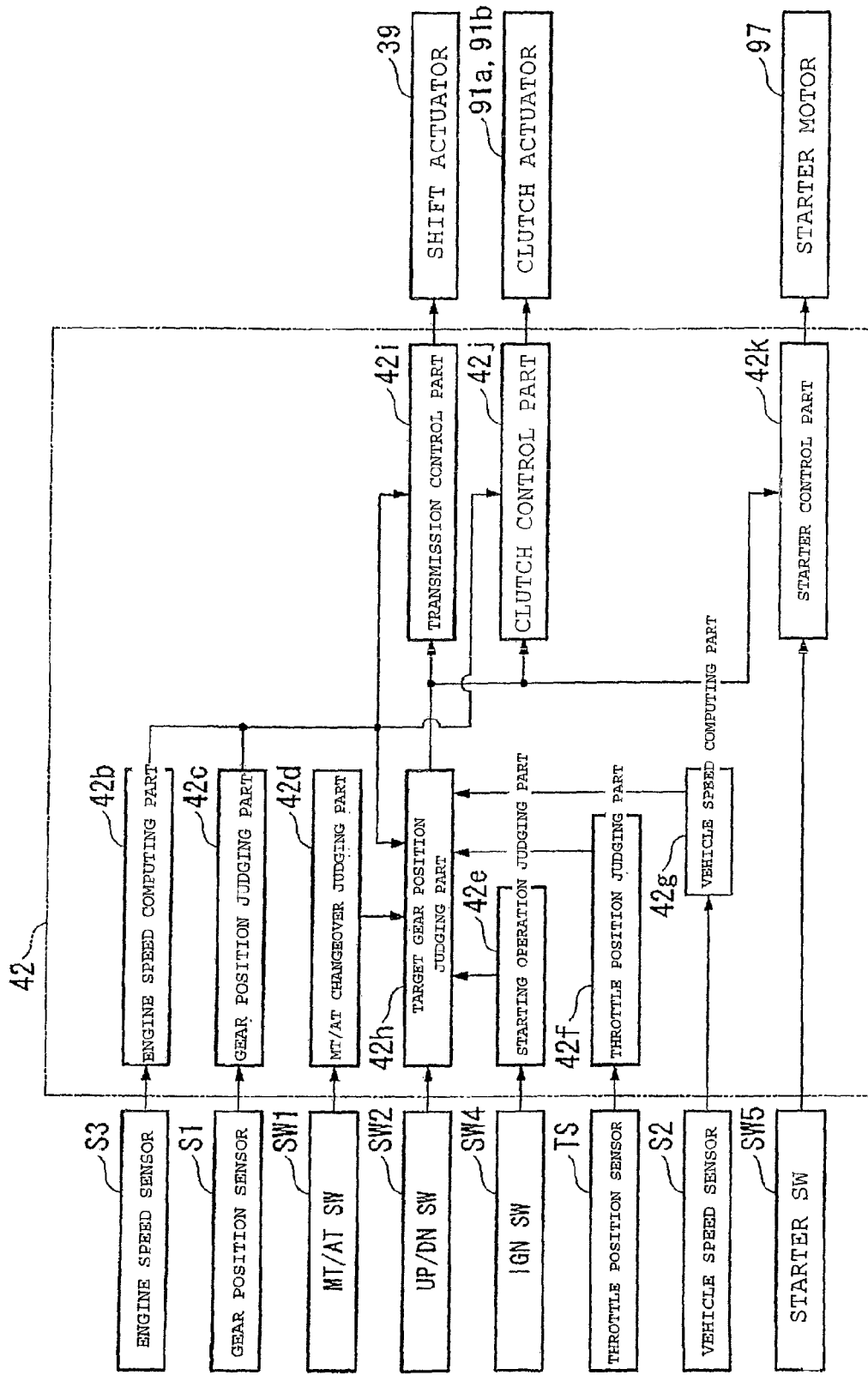
FIG. 6 is a block diagram of an essential part of the automatic speed change control system.

FIG. 6 is a block diagram of an essential part of the automatic speed change control system for the motorcycle 1. As shown in FIG. 6, the electronic control unit 42 includes an engine speed computing part 42b for computing the engine speed on the basis of data from the engine speed sensor S3, a gear position judging part 42c for judging the current gear position (shift condition) in the transmission 47 on the basis of data from the gear position sensor S1 and a MT/AT changeover judging part 42d for judging the changeover of MT/AT mode on the basis of an operation of the mode switch SW1. A starting operation judging part 42e is provided for judging a starting operation of the automatic speed change control system on the basis of an operation of turning ON an ignition switch (main switch) SW4 with a throttle position judging part 42f for judging the throttle position on the basis of data from the throttle position sensor TS and a vehicle speed computing part 42g for computing the vehicle speed on the basis of data from the vehicle speed sensor S2.

In addition, the electronic control unit 42 includes a target gear position judging part 42h for judging a target gear position for the transmission 47 on the basis of an operation of the gear selection switch SW2 and data from the computing parts 42b, 42g and the judging parts 42c to 42g, etc., a clutch control part 42i and a shift control part 42j for controlling the operations of clutch actuators 91a, 91b and a shift actuator 39 on the basis of the result of judgment in the target gear position judging part 42h, the current engine speed and gear position, and the like. A starter control part 42k is provided for controlling the operation of a starter motor (engine starting means) 97 on the basis of an operation (engine starting operation) on a starter switch (engine starting switch) SW5.

Figure 7:
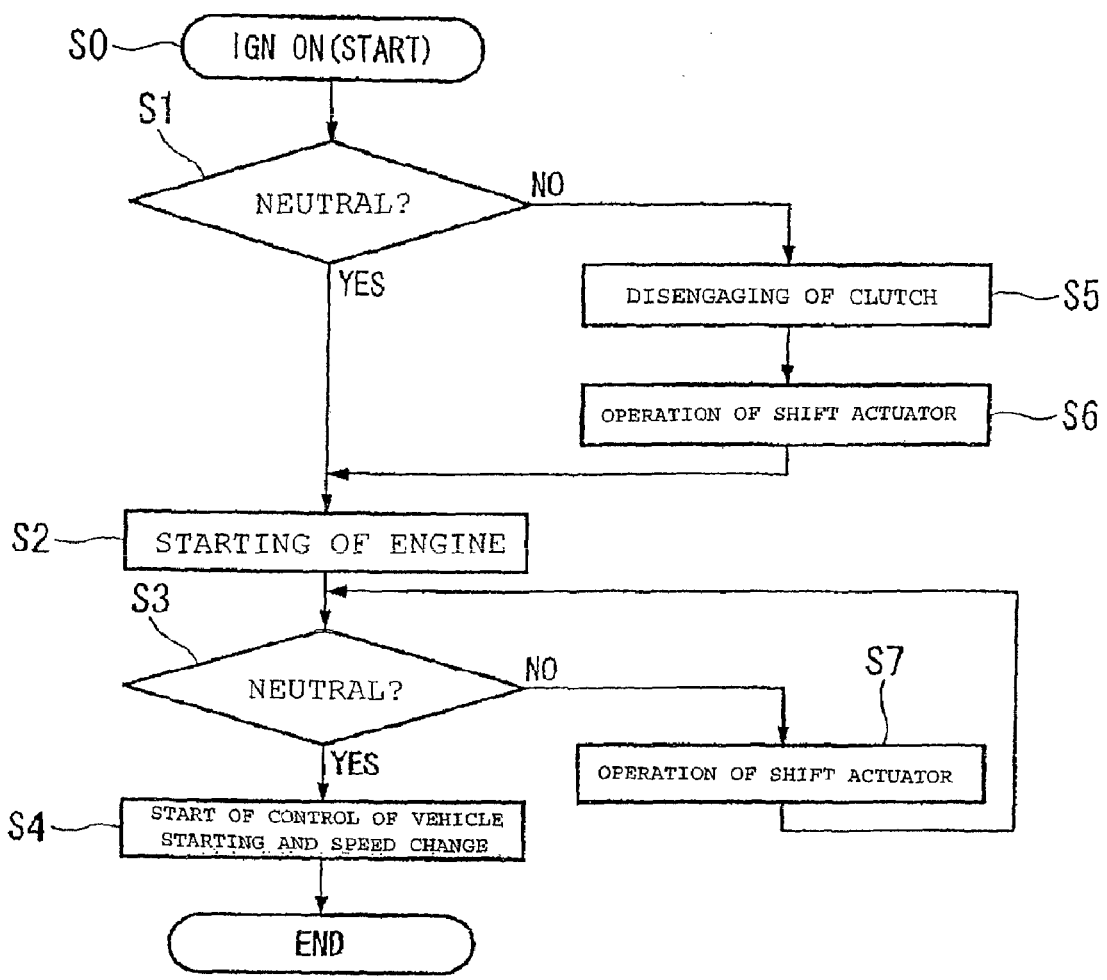
FIG. 7 is a flow chart showing a process at the time of starting the automatic speed change control system.

In the automatic speed change control system as above, a process as shown in FIG. 7 is executed at the time of starting the system.

More specifically, when an operation (system starting operation) of turning ON the ignition switch SW4 is conducted (step S0), the process is started. First, in the gear position judging part 42c, whether the current condition of the transmission 47 is in the neutral condition or not (whether the current gear position is in the neutral position or not) is judged (step S1).

When the judgment result is YES (when the current condition is the neutral condition), a control through the target gear position judging part 42h ensures that the starter control part 42k can receive an operation (engine starting operation) on the starter switch SW5. When the engine starting operation is made by use of the starter switch SW5 under this condition, the starter motor 97 is driven to enable starting of the engine (step S2).

On the other hand, when the result of judgment in step S1 is NO (when the transmission 47 is not in the neutral condition but in an in-gear condition), a control through the target gear position judging part 42h ensures that the clutch control part 42*j* operates the clutch actuators 91*a*, 91*b* and the like so as to disengage the clutches 51*a*, 51*b* of the twin clutches 26 (step S5), and the shift control part 42*i* operates the shift actuator 39 so as to put the transmission 47 into the neutral condition (step S6).

Thereafter, the process enters the step S2, in which the engine starting operation is made to be valid, thereby enabling the starting of the engine, as above-mentioned.

After the engine is started, whether the transmission 47 is in the neutral condition or not is again judged (step S3). When the result of this judgment is YES (when the transmission 47 is in the neutral condition), reception of operations of the switches SW1, SW2 and the like is enabled (validated) in the target gear position judging part 42*h*, and control of the starting and speed change of the motorcycle 1 is enabled (step S4), whereby the process is finished.

On the other hand, when the result of judgment in step S3 is NO (when the transmission 47 is not in the neutral condition), the shift control part 42*i* operates the shift actuator 39 so as to bring the transmission 47 into the neutral condition in the same manner as above (step S7), and the process returns to step S3, in which it is again judged whether the transmission 47 is in the neutral condition or not.

Here, even when the shift actuator 39 is operated in step S6 before the starting of the engine, transition of the transmission 47 into the neutral condition may be impossible because the rotation of the shift drum 24*a* is hindered by dog interference in the transmission 47 or the like trouble. However, after the engine is started, smooth rotation of the shift drum 24*a* can be realized while obviating the interference or the like. Taking this into account, the operation of the shift actuator 39 so as to bring the transmission 47 into the neutral condition is conducted a plurality of times around the time of starting the engine.

When the transmission 47 has been put into the neutral condition, the user is informed of it through turning-ON of a lamp on the meter device M or the like means. In addition, a configuration may be adopted in which a brake operation is needed at the time of putting the transmission 47 into the neutral condition by operating the shift actuator 39.

As has been described above, the automatic speed change control system for the motorcycle in the above embodiment includes the transmission 47 which is provided in the power transmission path between the engine 13 and the drive wheel (the rear wheel 11) and in which speed ratio in the power transmission is varied, and the shift actuator 39 for controlling the speed change operation of the transmission 47, wherein when the transmission is not in the neutral condition (but is in an in-gear condition) at the time when a predetermined system starting operation (an operation of turning ON the ignition switch SW4) is conducted, the shift actuator 39 is operated in the period from the time of the system starting operation to the time immediately after the starting of the engine so as thereby to put the transmission 47 into the neutral condition.

According to this configuration, even in the case where the transmission 47 is not in the neutral condition at the time of starting the system, the transmission 47 can be automatically returned into the neutral condition by use of the shift actuator 39 in the period from the system starting time to the time immediately after the starting of the engine. This ensures that the burden in the shifting operation conducted on the transmission 47 by the user (driver) after the system starting operation can be lessened. Thus, the convenience in the use of the transmission can be enhanced, and the vehicle starting operation after the starting of the system can be secured.

In addition, in the automatic speed change control system as discussed above, the operation of the shift actuator 39 is conducted a plurality of times until the transmission 47 is put into the neutral condition. This ensures that, even where the transmission 47 cannot be put into the neutral condition due to dog interference in the transmission 47 or the like trouble before the starting of the engine, the transmission 47 can be brought into the neutral condition automatically and assuredly, by again operating the shift actuator 39 immediately after the starting of the engine.

Further, in the automatic speed change control system as discussed above, the twin clutches 26 for making and interrupting the power transmission is provided, and, at the time of the operation of the shift actuator 39, the twin clutches 26 are put into the disengaged condition, whereby the engine can be securely started even if the transmission 47 is in an in-gear condition.

In addition, the present invention is not limited to the above-described embodiment. For example, the automatic speed change control system may be a system having a single clutch in place of the twin clutches 26, may be a system which gets an engaging force or an operating force for the clutch from a spring, a motor, a solenoid or the like, and may be a system having a dry type clutch or a single disk clutch.

In addition, the engine 13 may be a single-cylinder engine, a V-type engine, a horizontal opposed type engine, or the like, and may be a longitudinal type engine having a crankshaft laid along the vehicle front-rear direction, or the like.

Further, the transmission 47 may be one in which a slide member that is separate from gears is slid to thereby change over the gear position, and the number of speeds may be less than six or not less than seven.

Moreover, the vehicle is not limited to a motorcycle, and may be a saddle ride type vehicle with three or four wheels. Or, the present invention may be applied to a motor scooter type vehicle having a low-floor foot rest part.

In addition, the configurations in the above embodiment constitute merely an example of the present invention. Naturally, the present invention is applicable to four-wheel passenger cars and the like, and various modifications are possible within the scope of the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic speed change control system for a vehicle, comprising:
   a transmission provided in a transmission path between an engine and a drive wheel wherein a speed ratio in the transmission is varied; and
   a shift actuator for controlling a speed change operation of said transmission;
   wherein in an ignition switch ON position when said transmission is not in a neutral condition at a time when the ignition switch is ON, said shift actuator is operated so as to put said transmission into said neutral condition; and
   wherein in an engine starting position when said transmission is not in a neutral condition at a time of engine starting, said shift actuator is operated so as to put said transmission into said neutral condition.

2. The automatic speed change control system for the vehicle as set forth in claim 1, wherein the operation of said shift actuator to put said transmission into said neutral condition is conducted in a period from the time of said ignition switch ON position to a time immediately after the starting of said engine.

3. The automatic speed change control system for the vehicle as set forth in claim 2, wherein the operation of said shift actuator to put said transmission into said neutral condition is conducted a plurality of times until said transmission reaches said neutral condition.

4. The automatic speed change control system for the vehicle as set forth in claim 3, and further comprising a clutch for connecting and disconnecting said transmission, wherein said clutch is disengaged when said shift actuator is operated.

5. The automatic speed change control system for a vehicle as set forth in claim 3, wherein said system is a twin clutch type speed change control system in which a gear position is changed over by switching between a pair of clutches.

6. The automatic speed change control system for the vehicle as set forth in claim 2, and further comprising a clutch for connecting and disconnecting said transmission, wherein said clutch is disengaged when said shift actuator is operated.

7. The automatic speed change control system for a vehicle as set forth in claim 2, wherein said system is a twin clutch type speed change control system in which a gear position is changed over by switching between a pair of clutches.

8. The automatic speed change control system for the vehicle as set forth in claim 1, and further comprising a clutch for connecting and disconnecting said transmission, wherein said clutch is disengaged when said shift actuator is operated.

9. The automatic speed change control system for a vehicle as set forth in claim 1, wherein said system is a twin clutch type speed change control system in which a gear position is changed over by switching between a pair of clutches.

10. An automatic speed change control system for a vehicle, comprising:
   an engine;
   a transmission provided in a transmission path between the engine and a drive wheel wherein a speed ratio in the transmission is selectively varied between a neutral condition and a power transmitting condition; and
   a shift actuator for controlling a speed change operation of said transmission;
   wherein in an ignition switch ON position when said transmission is not in the neutral condition at a time when the ignition switch is ON, said shift actuator is selectively operated to place said transmission into said neutral condition; and
   wherein in an engine starting position when said transmission is not in a neutral condition at a time of engine starting, said shift actuator is operated so as to put said transmission into said neutral condition.

11. The automatic speed change control system for the vehicle as set forth in claim 10, wherein the operation of said shift actuator to put said transmission into said neutral condition is conducted in a period from the time of said ignition switch ON position to a time immediately after the starting of said engine.

12. The automatic speed change control system for the vehicle as set forth in claim 11, wherein the operation of said shift actuator to put said transmission into said neutral condition is conducted a plurality of times until said transmission reaches said neutral condition.

* * * * *